United States Patent
Busick et al.

(10) Patent No.: US 6,736,298 B2
(45) Date of Patent: May 18, 2004

(54) THERMOELECTRIC WATER COOLER WITH FILTER MONITOR SYSTEM

(75) Inventors: Louis M. Busick, Columbus, OH (US); John W. Host, Lake Mary, FL (US); Larry L. Nichols, Valencia, CA (US); Stephen W. Wharton, Columbus, OH (US)

(73) Assignee: Oasis Corporation, Columbus, OH (US)

( * ) Notice: Subject to any disclaimer, the term of this patent is extended or adjusted under 35 U.S.C. 154(b) by 88 days.

(21) Appl. No.: 10/114,861

(22) Filed: Apr. 2, 2002

(65) Prior Publication Data

US 2002/0145009 A1 Oct. 10, 2002

Related U.S. Application Data

(60) Provisional application No. 60/282,362, filed on Apr. 7, 2001.

(51) Int. Cl.[7] .................................................. B67D 5/62
(52) U.S. Cl. ................ 222/638; 222/146.1; 222/146.6; 222/185.1; 222/189.09
(58) Field of Search ........................... 222/638, 146.1, 222/146.6, 185.1, 189.06, 189.09

(56) References Cited

U.S. PATENT DOCUMENTS

| | | | |
|---|---|---|---|
| 5,192,004 A | | 3/1993 | Burrows |
| 5,209,069 A | * | 5/1993 | Newnan ................ 62/3.64 |
| 5,370,276 A | | 12/1994 | Burrows |
| 5,413,152 A | | 5/1995 | Burrows |
| 5,502,978 A | | 4/1996 | Field |
| 5,540,355 A | | 7/1996 | Hancock et al. |
| 5,597,487 A | | 1/1997 | Vogel et al. |
| 5,935,426 A | * | 8/1999 | Giordano et al. ............ 210/87 |
| 6,003,318 A | | 12/1999 | Busick et al. |
| 6,085,540 A | | 7/2000 | Davis |
| 6,139,726 A | * | 10/2000 | Greene ....................... 210/94 |
| 6,167,921 B1 | | 1/2001 | Busick et al. |
| 6,289,690 B1 | | 9/2001 | Davis |

* cited by examiner

Primary Examiner—Joseph A. Kaufman
(74) Attorney, Agent, or Firm—Kelly Bauersfeld Lowry & Kelley, LLP

(57) ABSTRACT

A filter monitor system is provided in a bottled water cooler for automatically tracking a filter service interval, and for indicating that filter cleaning or replacement is required for continued efficient cooler operation. In the preferred form, the water cooler includes a thermoelectric chiller module for chilling at least a portion of water contained within a cooler reservoir. An air filter is mounted on a filter frame which is removably positioned for filtering air drawn by a fan to circulate over a heat sink associated with the thermoelectric chiller module. The filter monitor system includes a reset switch engaged by the filter frame to initiate and track a predetermined filter service time interval, such as thirty days, and to energize a signal such as an indicator light at the conclusion of this service interval to indicate that the air filter should be removed for cleaning or replacement.

22 Claims, 5 Drawing Sheets

THERMOELECTRIC WATER COOLER WITH FILTER MONITOR SYSTEM

This application claims the benefit of U.S. Provisional Application No. 60/282,362, filed Apr. 7, 2001.

BACKGROUND OF THE INVENTION

This invention relates generally to improvements in bottled water coolers for use in providing a chilled supply of water for drinking, cooking, etc. More particularly, this invention relates to a bottled water cooler of the type having a thermoelectric module for chilling the water supply, wherein the thermoelectric module includes air circulation means for circulating a flow of cooling air over a heat sink, and further wherein the water cooler includes means for prompting timely cleaning or replacement of an air filter associated with the air circulation means to insure continued energy-efficient water chilling.

Bottled water coolers are well known in the art for containing a supply of relatively purified water in a convenient manner and location ready for substantially immediate dispensing and use. Such water coolers commonly include an upwardly open reservoir adapted to receive and support a water bottle of typically three to five gallon capacity in an inverted orientation such that bottled water may flow downwardly into the cooler reservoir. A spigot or faucet valve on the front of a cooler housing is operable at any time to dispense the water in selected amounts. Such bottled water coolers are widely used to provide a clean and safe source of drinking water, especially in areas wherein the local water supply may or is suspected to contain undesired levels of harmful contaminants. Alternative so-called point-of-use water coolers are also known in the art wherein the cooler is connected to a water supply line and includes water filtration and/or purification means such as a reverse osmosis unit for purifying water supplied to the cooler reservoir.

In many water coolers of the type described above, it is desirable to refrigerate at least a portion of the water within the cooler reservoir to a relatively low temperature to provide a highly pleasing and refreshing source of drinking water. However, refrigeration equipment for such water coolers has typically comprised conventional compressor-type mechanical refrigeration systems which undesirably increase the overall cost, complexity, size, operational noise level, and power consumption requirements of the water cooler. Alternative cooling system proposals have suggested the use of relatively compact and quiet thermoelectric heat transfer modules, such as the systems shown and described in U.S. Pat. Nos. 5,072,590 and 6,003,318. In such proposals, a thermoelectric module is mounted with a cold side in heat transfer relation with water within the cooler reservoir, and a hot side of the module is associated with a heat sink for dissipating heat drawn from the water. A cooling fan is normally provided for circulating air over the heat sink for improved heat transfer and energy-efficient operation.

While thermoelectric chiller systems are relatively simple in construction and quiet in operation, such systems nevertheless exhibit certain potential disadvantages which have limited their widespread adoption and use. More specifically, and by way of one important example, the chilling capacity of the thermoelectric module is relatively small in comparison with the chilling capacity of a conventional mechanical refrigeration system, resulting in a slower recovery time to provide chilled water following a large withdrawal or several successive withdrawals of water from the cooler reservoir. To minimize the impact of this reduced chilling capacity, it is essential to operate the thermoelectric module in a mode for substantially optimized heat transfer to and heat dissipation from the heat sink at all times. However, airborne contaminants present in the circulatory air flow passed over the heat sink can accumulate rapidly as a coating on the exterior surfaces of the heat sink to obstruct efficient convective heat transfer to the circulatory air flow, resulting in inefficient and slower chilling of the water within the cooler reservoir. Air filters have been provided to filter the circulatory air flow passed over the heat sink, as described in U.S. Pat. No. 6,033,318. However, such air filters also become clogged with collected airborne contaminants over a relatively short period of time, and must be regularly cleaned or replaced to avoid significant air flow reduction and associated reduced heat transfer efficiency.

Existing water coolers of the type having a thermoelectric chiller module, and further including air circulation means for delivering a flow of filtered air over the exterior surfaces of a heat sink, have not provided an effective means for monitoring the condition of the associated air filter to insure regular inspection, cleaning or replacement of the air filter. Instead, air filter cleaning or replacement have been performed sporadically at best, with the result that the thermoelectric chiller module is often operated in an inefficient manner for extended periods of time.

The present invention overcomes these problems and disadvantages by providing a filter monitor system designed to provide a convenient yet readily visible signal that a filter service interval has expired, and that the air filter needs to be removed from the water cooler for appropriate cleaning or replacement.

SUMMARY OF THE INVENTION

In accordance with the invention, a filter monitor system is provided in a bottled water cooler for automatically tracking a filter service interval, and for indicating that filter cleaning or replacement is required for continued efficient cooler operation. The filter monitor system is particularly designed for use with a water cooler of the type having a thermoelectric chiller module for chilling at least a portion of water contained within a cooler reservoir, in combination with air circulation means for delivering a filtered air flow over the exterior surfaces of a heat sink to dissipate heat collected from water contained within a cooler reservoir. The filter monitor system indicates when an air filter, provided as part of the air circulation means, should be removed from the water cooler for inspection, cleaning or replacement.

In a preferred form of the invention, the thermoelectric chiller module is mounted with a cold side thereof in heat transfer relation with water contained within the cooler reservoir. A hot side of the thermoelectric chiller module is positioned in heat transfer relation with a heat sink having an extended exterior surface area, whereby heat energy is transferred by the chiller module from the water within the reservoir to the heat sink. The air circulation means comprises a fan for delivering or otherwise causing a flow of cooling air to pass over the exterior surface area of the heat sink for collecting and dissipating heat energy therefrom. The air filter is mounted on a filter frame which is removably positioned for filtering this fan-induced air flow.

A reset switch is mounted on the water cooler in a position to be contacted and reset by the filter frame each time the air filter is mounted on the water cooler. The reset switch activates a timer which tracks a predetermined filter service interval, such as about thirty days, and then energizes a service signal as by illuminating a light visible from the exterior of the water cooler to indicate that it is time to remove the air filter for inspection, cleaning or replacement. In one form, the timer may also be coupled to a deactivation switch for turning the cooler off in the event that the air filter is not removed from the cooler within a predetermined maximum filter service time, such as about sixty days.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
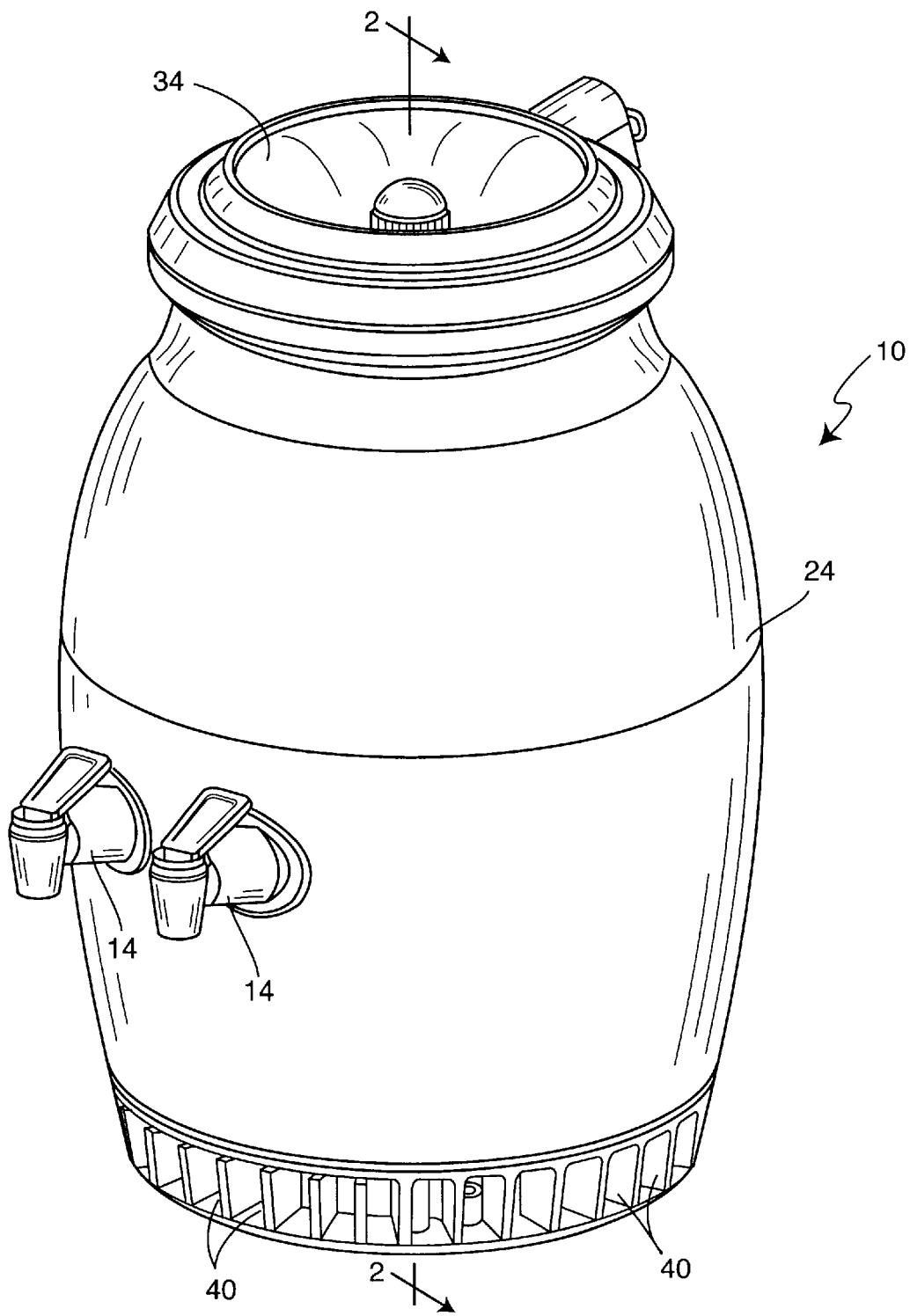
FIG. 1 is a perspective view illustrating a countertop water cooler including thermoelectric chiller means, and further adapted to include a filter monitor system in accordance with the novel features of the invention.

As shown in the exemplary drawings, a water cooler referred to generally in FIGS. 1–4 by the reference numeral 10 includes a reservoir 12 (FIGS. 2 and 4) for containing a supply of water which can be dispensed on demand via one or more faucet valves 14. A thermoelectric chiller module 16 (FIG. 2) chills at least a portion of the water within the reservoir 12 by extracting heat energy from the water, and by transmitting the heat energy to a heat sink 18 for dissipation. A cooling fan 20 circulates a flow of cooling air over the heat sink 18, with an air filter 22 being provided to collect and remove airborne contaminants from this circulatory air flow. In accordance with the invention, a filter monitor system is provided for prompting removal of the air filter 22 from the cooler 10 at the end of a predetermined filter service interval, for appropriate filter inspection, cleaning or replacement.

Figure 2:
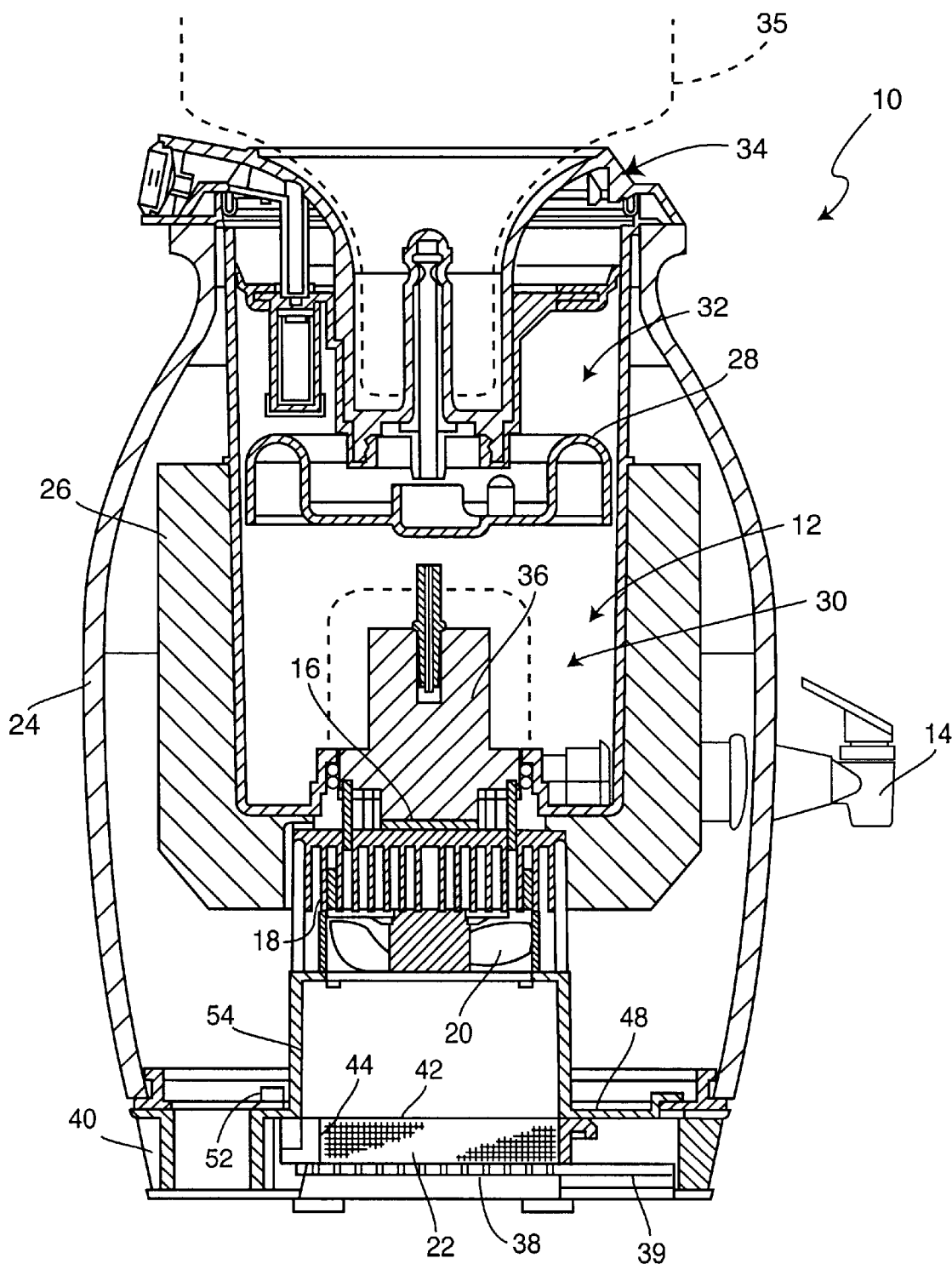
FIG. 2 is a vertical sectional view taken generally on the line 2—2 of FIG. 1.

The water cooler 10 depicted in the illustrative drawings comprises a countertop style water cooler generally as shown and described in U.S. Pat. No. 6,003,318, which is incorporated by reference herein. More particularly, the illustrative water cooler 10 generally comprises a cooler housing 24 having a compact size and shape for placement on a suitable countertop (not shown), wherein this cooler housing 24 may have a ceramic or earthenware construction defining an open top for receiving and supporting the upwardly open reservoir 12. In a preferred form, the water reservoir 12 is constructed from molded plastic or the like for slide-fit installation into and slide-out removal from the housing 24, with an upwardly open generally cup-shaped insulation block 26 (FIG. 2) mounted within the cooler housing 24 to receive and support the reservoir 12 in a position for normal operation. FIG. 2 shows a conventional baffle plate 28 installed within the reservoir 12 to subdivide the reservoir interior volume into a chilled lower water chamber 30 and a substantially unchilled upper water chamber 32, with a pair of the faucet valves 14 being adapted as is known in the art for separate dispensing of water respectively from these two chamber 30, 32, as shown and described by way of example in U.S. Pat. Nos. 5,192,004 and 5,370,276 which are also incorporated by reference herein.

The illustrative water cooler 10 additionally includes a feed tube adapter unit 34 (FIGS. 1–2) mounted at the top of the cooler housing 24 and the reservoir 12 for receiving and supporting a water bottle 35 (shown in dotted lines in FIG. 2) in an inverted position over the cooler reservoir. This feed tube adapter 34 may be constructed as shown and described in U.S. Pat. Nos. 5,413,152; 6,167,921; or copending U.S. patent application Ser. No. 60/268,381, filed Feb. 8, 2001, all of which are incorporated by reference herein. The feed tube adapter unit 34 is designed to engage and open a valved bottle cap on the inverted water bottle to permit downward flow of water from the bottle into the reservoir interior, with a concurrent upward flow of replacement air from the reservoir into the bottle interior. Persons skilled in the art will recognize and appreciate, however, that the inclusion of the feed tube adapter unit 34 is optional. Persons skilled in the art will also recognize that the water cooler 10 shown in the exemplary drawings may take other forms, such as a conventional water cooler of the type having a free-standing cooler housing designed to sit upon a floor surface, and/or a so-called point-of-use water cooler wherein the cooler reservoir receives a water inflow from a filtration system which may include reverse osmosis purification components.

The thermoelectric chiller module 16 (FIG. 2) is mounted at a lower end of the cooler reservoir 12, with a cold side thereof in thermal heat transfer relation with a chiller probe 36. As shown in FIG. 2, this chiller probe 36 extends upwardly into heat transfer relation with water contained within the lower chilled chamber 30 of the reservoir 12. The thermoelectric heat transfer module 16 operates to draw or extract thermal energy at the cold side thereof, thereby extracting heat energy from the water within the reservoir chamber 30, and to transfer the extracted heat energy to a hot side of the module 16 mounted in thermal heat transfer relation with the heat sink 18 having an extended exterior surface area. By suitably dissipating the heat from the heat sink 18, the thermoelectric module 16 effectively chills the water within the reservoir chamber 30 to a pleasing and refreshing temperature level. Such thermoelectric heat transfer modules are available from Borg-Warner Corporation under model designation 920-31, and employ semiconductor materials with dissimilar characteristics (P-type and N-type materials) connected electrically in series and thermally in parallel.

The heat sink 18 includes a plurality of heat dissipation fins projecting downwardly from the chiller module 16 in spaced-apart and generally parallel relation, to define an extended exterior surface area with intervening air flow passages for circulation of cooling air to carry away the collected heat energy (FIG. 2). The cooling fan 20 is mounted at the underside of the heat sink 18 for delivering a substantial yet relatively quiet air flow through these flow passages for heat collection and dissipation. As shown best in FIG. 2, the cooling fan 20 may comprise a pancake-type fan assembly oriented to draw ambient air upwardly through a central grille 38 (FIGS. 2 and 3) formed in a lower base plate 39, for flow into heat transfer relation with the heat sink 18, with the air flow passing further outwardly from the heat sink 18 and exiting the cooler housing 24 via a series of circumferentially spaced lower vents 40.

The air filter 22 is provided at an upstream side of the cooling fan 20 to collect and separate airborne contaminants from the cooling air flow. The air filter 22 thus prevents accumulation of such airborne contaminants on the exterior surfaces of the heat sink 18. In this regard, such contaminants can otherwise rapidly form a surface coating on the heat sink 18 which substantially reduces the convective heat transfer efficiency with the cooling circulatory air flow, and thereby substantially reduces the efficiency of the thermoelectric chiller module 16 to chill the water in the reservoir. As shown best in FIG. 3, the air filter 22 comprises a selected porous filtration media 42 carried by a open-bottomed, generally tray-shaped filter frame 44 for slide-fit installation into an open-ended slide track 46 formed in a lower region of the cooler housing 24 on an upper side of the lower base plate 39. A front handle member 48 may be provided on the filter frame 44 for convenient pull-out removal from the housing 24, wherein this handle member 48 may be exposed upon removal of a snap-fit mounted exterior trim segment 50.

Figure 3:
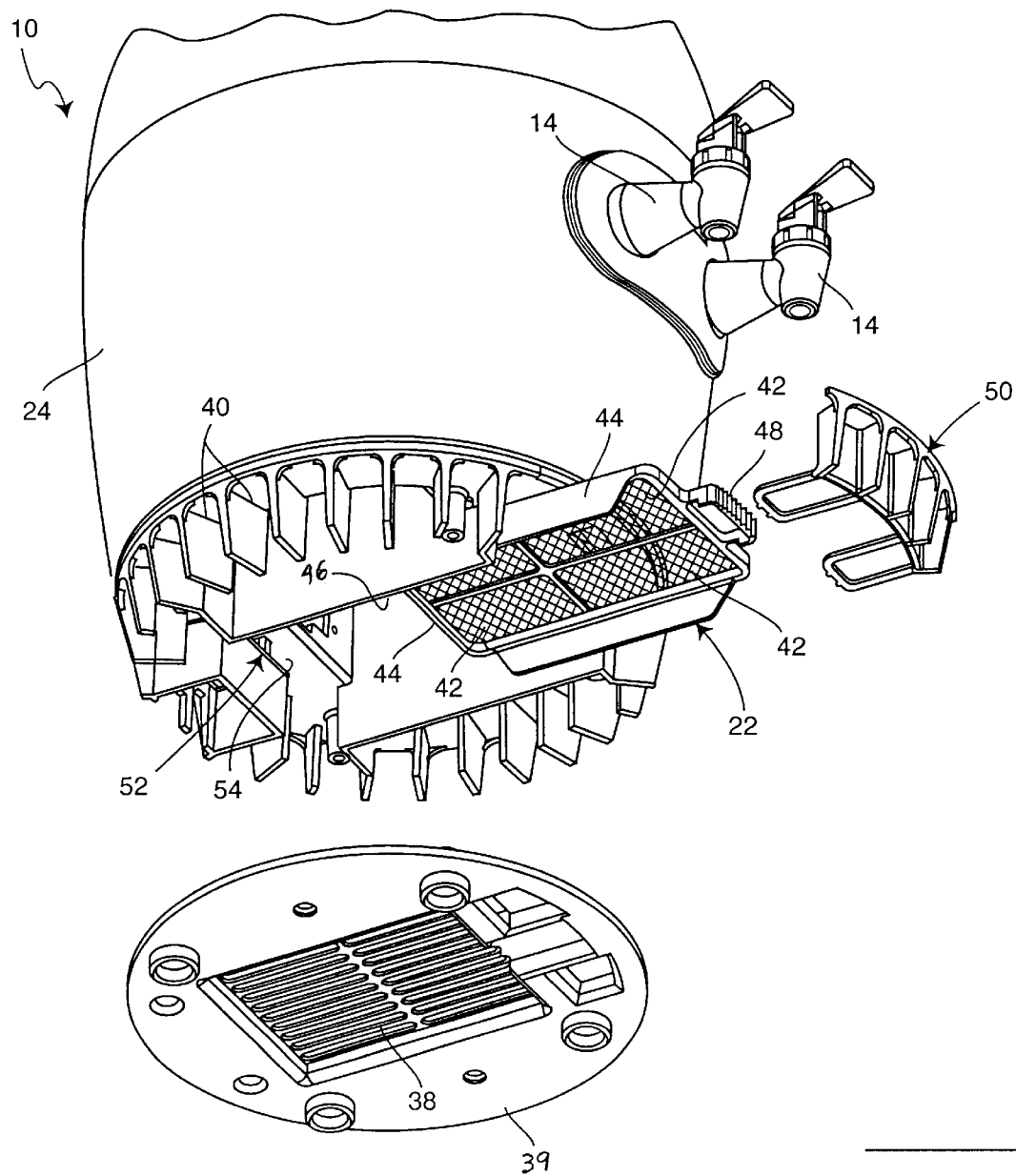
FIG. 3 is an exploded and fragmented perspective view showing assembly of an air filter within a lower region of the water cooler.
Figure 4:
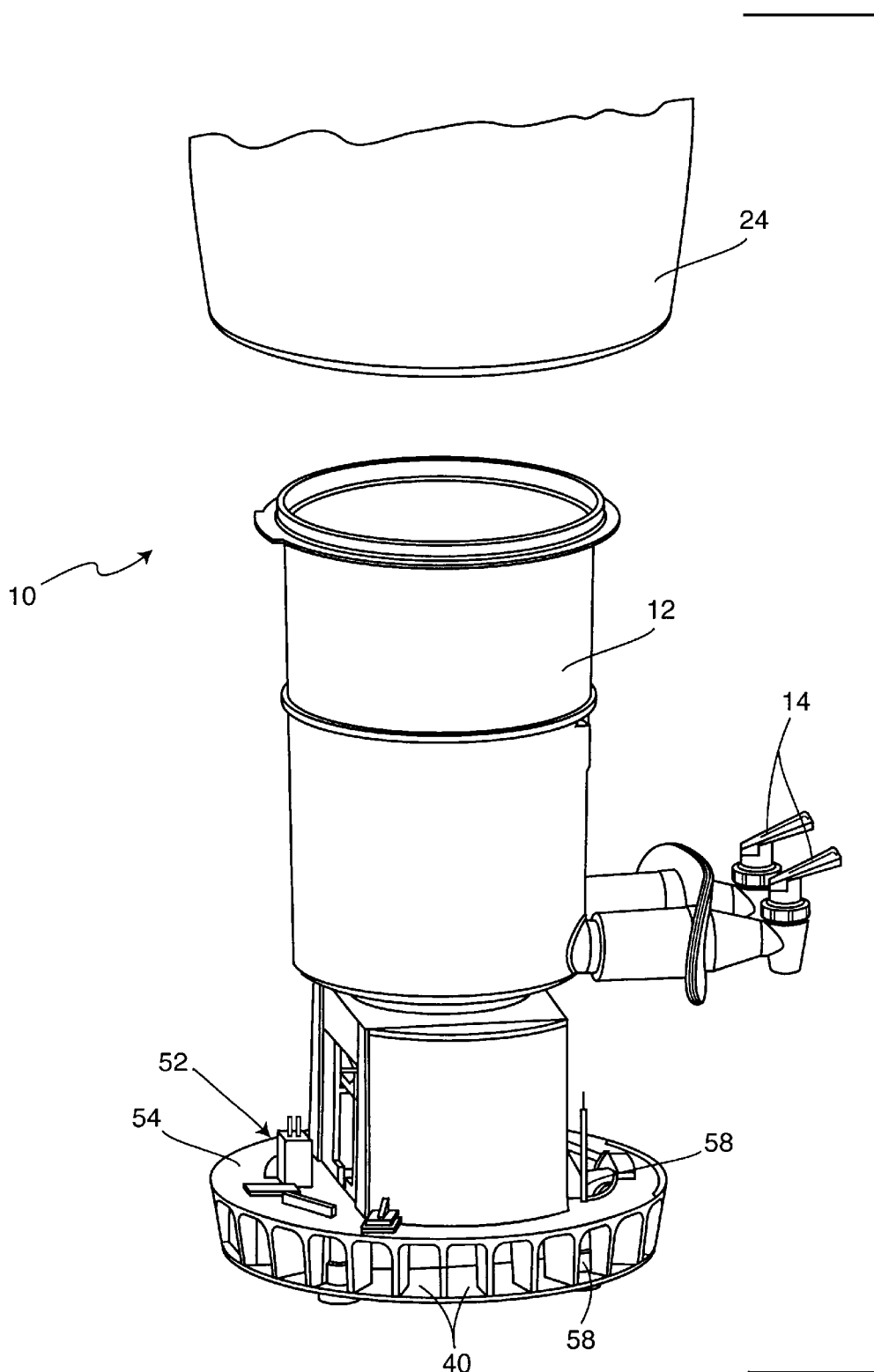
FIG. 4 is an exploded and fragmented perspective view showing a cooler reservoir mounted onto a lower base frame of the water cooler.
Figure 5:
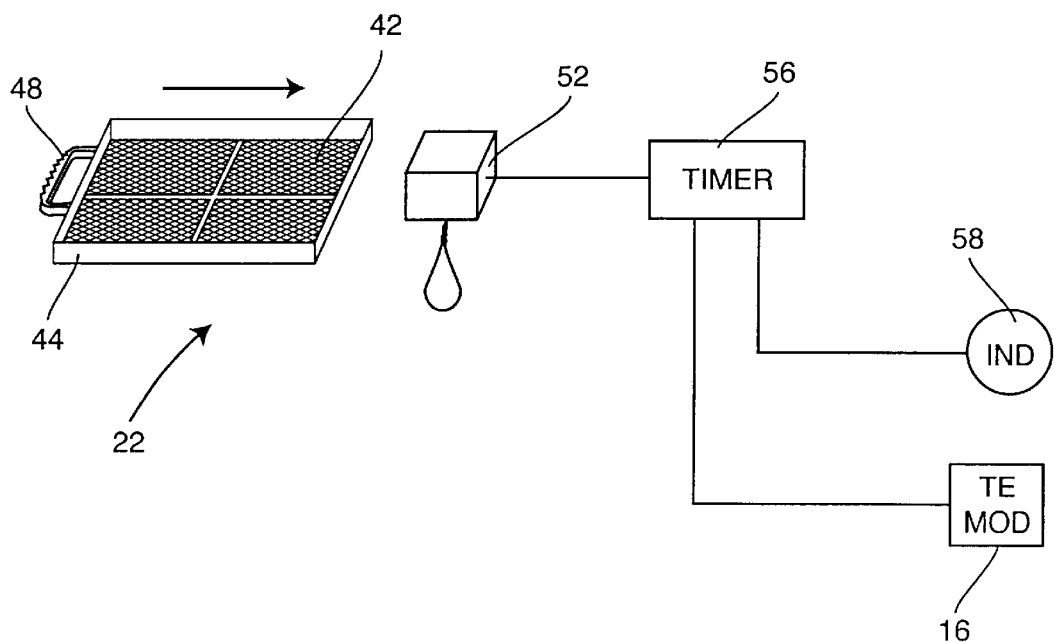
FIG. 5 is a schematic circuit diagram depicting the filter monitor system of the present invention.

In accordance with the invention, a reset switch 52 is engaged and tripped each time the filter frame 44 is installed into the cooler housing 24, to place the air filter 22 in its operational position. FIGS. 2–4 show the reset switch 52 mounted on a housing base frame 54 at a rear side of the filter slide track 46, for engagement by a rear edge of the filter frame 44 each time the air filter 22 is installed. This reset switch signals a timer 56 (FIG. 5) to initiate and track a predetermined filter service interval such as about 30 days, whereupon a signal is provided at the conclusion of this filter service interval to prompt removal of the air filter 22 from the cooler 10 for inspection, cleaning or replacement. A preferred signal comprises an indicator light 58 (FIG. 4) mounted within a lower region of the cooler housing 24 for easy visual detection through one of the lower vents 40. Subsequent replacement of the air filter 22 including the filter frame 44 into the cooler housing 24 resets the timer 56 by re-engaging the reset switch 52 to initiate and track a subsequent filter service interval.

In one form of the invention, the timer 56 may additionally include means for concurrently initiating and tracking a maximum cooler operating interval, and for turning the cooler off in the event that the air filter 22 has not been removed for cleaning or replacement within a predetermined maximum time period. For example, the timer 56 may additionally function to turn the thermoelectric chiller module 16 off in the event that the filter 22 has not been removed from the cooler housing 24 within a predetermined maximum time interval such as 60 days.

The filter monitor system of the present invention thus prompts regular inspection and appropriate cleaning or replacement of the air filter 22, so that the thermoelectric chiller module 16 operates in an efficient manner to maintain the water within the lower reservoir chamber 30 at a desirably chilled temperature. Collection of airborne contaminants on the exterior surfaces of the heat sink 18 is substantially avoided, and undesirable reduction in the circulatory air flow over the heat sink 18 due to filter clogging is also substantially avoided.

A variety of modifications and improvements in and to the filter monitor system of the present invention will be apparent to those persons skilled in the art. Accordingly, no limitation on the invention is intended by way of the foregoing description and accompanying drawings, except as set forth in the appended claims.

What is claimed is:

1. In a water cooler having a reservoir for receiving and storing a supply of water, dispense means for dispensing water from the reservoir, chiller means for chilling at least a portion of the water within the reservoir, and heat dissipation means for dissipating heat extracted from the water within the reservoir, said heat dissipation means including a heat sink, a fan for providing a flow of cooling air across said heat sink in heat transfer relation therewith, and a filter for collecting airborne contaminants from said flow of cooling air, a filter monitoring system, comprising:

timer means for tracking a predetermined filter service interval;

switch means for actuating said timer means to initiate said predetermined service interval; and indicator means actuated by said timer means at the conclusion of said predetermined service interval for prompting filter service;

said timer means further tracking a predetermined maximum time period longer than said predetermined filter service interval, said switch means actuating said timer means to initiate said predetermined maximum time period, and said timer means further including means for de-activating said chiller means at the conclusion of said predetermined maximum time period.

2. The filter monitoring system of claim 1 wherein said indicator means comprises an indicator light.

3. The filter monitoring system of claim 1 wherein said switch means comprises a reset switch mounted on said water cooler for engagement by said filter to initiate said predetermined filter service interval, upon mounting of said filter on said water cooler.

4. The filter monitoring system of claim 1 wherein said predetermined service interval is about 30 days.

5. The filter monitoring system of claim 1 wherein said predetermined service interval is about 30 days, and further wherein said predetermined maximum time period is about 60 days.

6. The filter monitoring system of claim 1 wherein said chiller means comprises a thermoelectric chiller module.

7. The filter monitoring system of claim 1 wherein said filter comprises a porous filter element mounted on a frame, said frame being removably mounted on said water cooler, said frame being adapted to engage said switch means upon mounting thereof on said water cooler to initiate said predetermined service interval.

8. In a water cooler having a reservoir for receiving and storing a supply of water, dispense means for dispensing water from the reservoir, chiller means for chilling at least a portion of the water within the reservoir, and heat dissipation means for dissipating heat extracted from the water within the reservoir, said heat dissipation means including a heat sink, a fan for providing a flow of cooling air across said heat sink in heat transfer relation therewith, and a filter for collecting airborne contaminants from said flow of cooling air, said filter being removably mounted on said water cooler, a filter monitoring system, comprising:

timer means for tracking a predetermined filter service interval;

switch means responsive to mounting of said filter on said water cooler for actuating said timer means to initiate said predetermined service interval; and indicator means actuated by said timer means at the conclusion of said predetermined service interval for prompting filter service.

9. The filter monitoring system of claim 8 wherein said indicator means comprises an indicator light.

10. The filter monitoring system of claim 8 wherein said timer means further tracks a predetermined maximum time period, said switch means actuating said timer means to initiate said predetermined maximum time period, and said timer means further including means for de-activating said chiller means at the conclusion of said predetermined maximum time period.

11. The filter monitoring system of claim 10 wherein said predetermined maximum time period is longer than said predetermined service interval.

12. The filter monitoring system of claim 8 wherein said chiller means comprises a thermoelectric chiller module.

13. The filter monitoring system of claim 8 wherein said filter comprises a porous filter element mounted on a frame, said frame being removably mounted on said water cooler, said frame being adapted to engage said switch means upon mounting thereof on said water cooler to initiate said predetermined service interval.

14. A water cooler, comprising:
    a reservoir for receiving and storing a supply of water;
    dispense means for dispensing water from the reservoir;
    a thermoelectric chiller module having a hot side and a cold side, said cold side being disposed in thermal communication with at least a portion of the water within the reservoir to extract heat therefrom, said chiller module transferring said extracted heat to said hot side;
    heat dissipation means for dissipating heat extracted from the water within the reservoir, said heat dissipation means including a heat sink in thermal communication with said thermoelectric chiller module hot side, a fan for providing a flow of cooling air across said heat sink in heat transfer relation therewith, and a filter removably mounted on said water cooler for collecting airborne contaminants from said flow of cooling air;
    timer means for tracking a predetermined filter service interval;
    switch means responsive to mounting of said filter on said water cooler for actuating said timer means to initiate said predetermined service interval; and
    indicator means actuated by said timer means at the conclusion of said predetermined service interval for prompting filter service.

15. The filter monitoring system of claim 14 wherein said indicator means comprises at least one indicator light visible from the exterior of said water cooler.

16. The filter monitoring system of claim 14 wherein said timer means further tracks a predetermined maximum time period, said switch means actuating said timer means to initiate said predetermined maximum time period, and said timer means further including means for de-activating said chiller means at the conclusion of said predetermined maximum time period.

17. The filter monitoring system of claim 16 wherein said predetermined maximum time period is longer than said predetermined service interval.

18. The filter monitoring system of claim 14 wherein said filter comprises a porous filter element mounted on a frame, said frame being removably mounted on said water cooler, said frame being adapted to engage said switch means upon mounting thereof on said water cooler to initiate said predetermined service interval.

19. In a filter system having a filter mounted within a housing and positioned for removing contaminants from an air flow stream flowing through said filter, a filter monitoring system, comprising:
    timer means for tracking a predetermined filter service interval;
    switch means responsive to mounting of said filter within said housing for actuating said timer means to initiate said predetermined service interval; and
    indicator means actuated by said timer means at the conclusion of said predetermined service interval for prompting filter service.

20. The filter monitoring system of claim 19 wherein said indicator means comprises an indicator light.

21. The filter monitoring system of claim 19 wherein said timer means further tracks a predetermined maximum time period longer than said predetermined filter service interval, said switch means being additionally responsive to mounting of said filter within said housing for actuating said timer means to initiate said predetermined maximum time period, and said timer means further including means for de-activating said chiller means at the conclusion of said predetermined maximum time period.

22. The filter monitoring system of claim 19 wherein said filter comprises a porous filter element mounted on a frame, said frame being removably mounted within said housing, said frame being adapted to engage said switch means upon mounting thereof within said housing to initiate said predetermined service interval.

* * * * *